(12) United States Patent
Xu et al.

(10) Patent No.: US 6,739,766 B2
(45) Date of Patent: May 25, 2004

(54) LENS ARRAY FOR USE IN PARALLEL OPTICS MODULES FOR FIBER OPTICS COMMUNICATIONS

(75) Inventors: Lee L. Xu, Cupertino, CA (US); Brian Kim, Fremont, CA (US); Darren Crews, Cupertino, CA (US)

(73) Assignee: Stratos International, Inc., Chicago, IL (US)

( * ) Notice: Subject to any disclaimer, the term of this patent is extended or adjusted under 35 U.S.C. 154(b) by 147 days.

(21) Appl. No.: 10/023,843

(22) Filed: Dec. 17, 2001

(65) Prior Publication Data

US 2003/0113077 A1 Jun. 19, 2003

(51) Int. Cl.[7] ................................. G02B 6/36
(52) U.S. Cl. ............................ 385/93; 385/88; 385/89; 385/92
(58) Field of Search ..................... 385/88–94

(56) References Cited

U.S. PATENT DOCUMENTS 6,547,455 B1 * 4/2003 Hashizume .................. 385/93

FOREIGN PATENT DOCUMENTS

| JP | 405088049 | * | 4/1993 |
| JP | 409243867 | * | 9/1997 |

* cited by examiner

Primary Examiner—Rodney Bevernick
Assistant Examiner—Juliana K. Kang
(74) Attorney, Agent, or Firm—Karl D. Kovach

(57) ABSTRACT

A lens array for use in fiber optic communications modules where multiple optical fibers are used in either transmitting or receiving optical signals. The lens array is adapted for optically interfacing a set of photoactive components such as semiconductor lasers or photo diodes deployed on an integrated circuit chip with a set of optical communications fibers supported in a ferrule. The individual lens elements within the array are shaped to have a greater height than width and are fitted together by being truncated along their boundaries with adjoining lenses. The increased height of the lens elements allows them to gather and transfer more light between the photoactive components and the optical fibers.

5 Claims, 8 Drawing Sheets

LENS ARRAY FOR USE IN PARALLEL OPTICS MODULES FOR FIBER OPTICS COMMUNICATIONS

FIELD OF THE INVENTION

The present invention relates generally to fiber optics communications and more specifically to parallel optics modules for use in fiber optic communications systems.

BACKGROUND OF THE INVENTION

The majority of computer and communication networks today rely on copper wiring to transmit data between nodes in the network. However, copper wiring has relatively limited bandwidth for carrying electrical signals which greatly constrains the amounts of data that it can be used to transmit.

Many computer and communication networks, including large parts of the Internet, are now being built using fiber optic cabling which has superior bandwidth capabilities and can be used to transmit much greater amounts of data. With fiber optic cabling, data is transmitted using optical or light signals (sometimes also called photonic signals) rather than with electrical signals. However, since computers use electrical signals as opposed to optical signals the light signals used to transmit data over fiber optic links must be translated to electrical signals and vice-versa during the optical communication process. Building such fiber optic networks therefore requires optoelectronic modules which mechanically and optically interface optical transmission mediums such as fiber optic cables to electronic computing and communications devices. Further, in order to provide the required bandwidth for high-speed communications multiple fiber optic elements must be used in networking equipment often referred to as "parallel optics" systems for concurrently transmitting multiple signals over a single cable. The associated optoelectronic modules must therefore also be adapted for accommodating cables having multiple fibers which are presented for connection purposes in closely spaced arrays of fiber optic elements supported in special ferrules attached to the ends of the cables.

Signal conversion from electrical to optical and optical to electrical may be provided for through the use of corresponding arrays of semiconductor elements (photoactive components) which are deployed on semiconductor chips (optoelectronic devices). These photoactive components may typically be semiconductor devices such as photodiodes which act as photo-receivers or laser diodes which act as photo-transmitters. While modules using such devices can provide satisfactory signal conversion performance, the building of effective parallel optics subassemblies is a challenge. The optical and mechanical alignment of the photoactive components with the ends of the thread-like fiber optic elements must be precise for effective transfer of optical power. Since the fiber optic ends in parallel optics modules are closely spaced the complexity of this alignment task is further increased. Arrays of lenses are ordinarily positioned between the fiber ends and the photoactive devices for directing the photonic signals between them. The lens in these arrays need to be appropriately designed for efficiently collecting and focusing the light being transferred between the fibers and semiconductor components and need to be precisely aligned and positioned between the fibers and semiconductor components for effectively directing the photonic signals.

SUMMARY OF THE INVENTION

The present invention relates to lens arrays for use in fiber optic communications modules where multiple optical fibers are used for either transmitting or receiving optical signals. The lens array is adapted for optically interfacing a set of photoactive components such as semiconductor lasers or photo diodes deployed on an optoelectronic device (integrated circuit chip) with a set of optical communications fibers supported in an optical ferrule. The lens array is linearly deployed and is characterized by a fixed pitch or center-of-lens to center-of-lens distance which reflects the pitch of the fibers in the ferrule. The individual lens elements within the array are sized to have a greater lens diameter than the pitch distance and are accordingly laterally truncated at their boundaries with adjoining lens halfway between the lens centers. The lenses therefore have a greater height than lateral width. The increased height of the lens elements allows them to gather and transfer more light than would be the case with lenses having diameters which reflect the exact pitch of the fibers in the fiber array. The lens array is deployed as an integral part of a one piece lens and alignment frame. The lens and alignment frame includes a set of guide pins which are accurately positioned with respect to the lens array. The guide pins mate with corresponding alignment holes in the ferrule for precisely positioning the lenses with respect to the fibers in the ferrule. The fibers and lenses are in turn also precisely aligned with the photoactive components of the optoelectronic device (integrated circuit chip) which is attached to a carrier assembly onto which the lens and alignment frame is precisely mounted.

BRIEF DESCRIPTION OF THE DRAWINGS

The invention and its advantages may best be understood by reference to the following description taken in conjunction with the accompanying drawings in which:

FIG. 5 is a side view of the fiber optic communications module shown in FIG. 1 illustrating, among other things, the position of the carrier assembly within the subassembly and how the optoelectronic subassembly may be pluggably connected to a jack mounted on a printed circuit board of a communications system or the like;

DETAILED DESCRIPTION OF THE INVENTION

The present invention will now be described in detail with reference to preferred embodiments as illustrated in the accompanying drawings. In the following description, numerous specific details are set forth in order to provide a thorough understanding of the present invention. However, it should be apparent to one skilled in the art that the present invention may be practiced without some or all of these specific details. In other instances it should be appreciated that well-known process steps have not been described in detail in order to not obscure the present invention.

Figure 1:
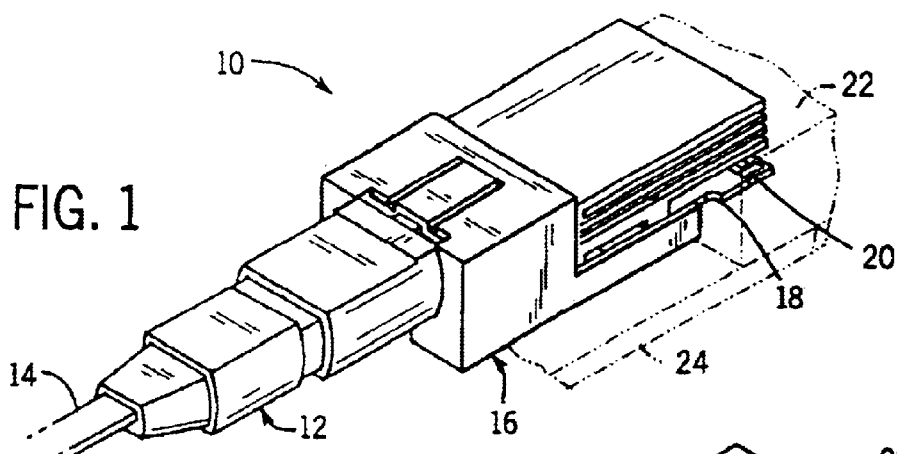
FIG. 1 is an overhead, perspective view of a fiber optic communications module constructed in accordance with the principles of the present invention showing a ferrule supporting multiple optical communications fibers interconnected with an optoelectronic subassembly for use in converting optical signals to electrical signals or vice-versa.
Figure 2:
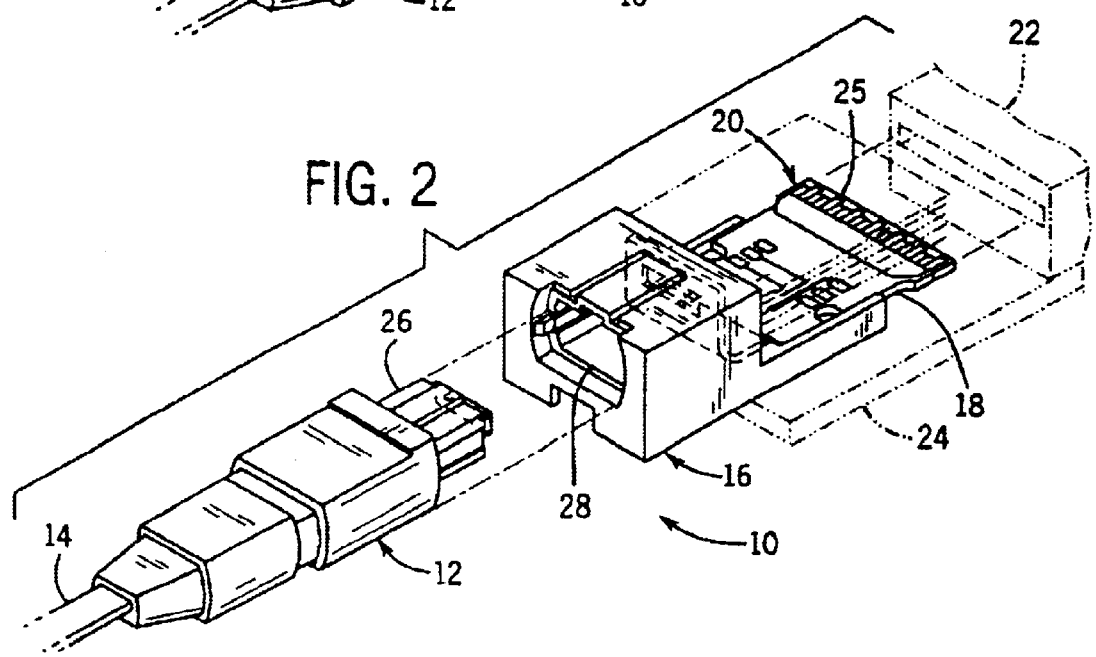
FIG. 2 is an overhead, perspective view of the fiber optics communications assembly shown in FIG. 1 with the ferrule disconnected from the subassembly and the subassembly unplugged from the jack to or from which it transferes electrical signals.

Referring now to FIGS. 1 and 2, a fiber optic connector assembly 10 is shown as comprising an optical ferrule 12 of the type sometimes referred to in the industry as an MT ferrule installed on the end of a cable 14 carrying multiple fiber optic communication elements 17 (not shown in FIGS. 1–2) and an optoelectronic subassembly 16 which operates as a transceiver module for either transmitting light (photonic) signals or receiving light signals and converting these signals to or from electrical signals. The subassembly 16 includes a small printed circuit board (PCB) 18 having an edge connector 20 with connection pads 25 on both sides which can be readily plugged into and out of an electrical connection jack 22 (in phantom) mounted on a circuit board 24 (in phantom) of a computer or communications system to or from which data can then be relayed over the cable 14 through the subassembly 16. The ferrule 12 and subassembly 16 are adapted for interconnection when the proximal end 26 of the ferrule 12 is inserted and latched within a cavity 28 in the subassembly 16. The ferrule 12 and subassembly 16 are then positioned and aligned so that optical signals can be transmitted either to or from the ferrule 12 and from or to the subassembly 16 for enabling data flow between the cable 14 and printed circuit board 24 (in phantom).

Figure 3:
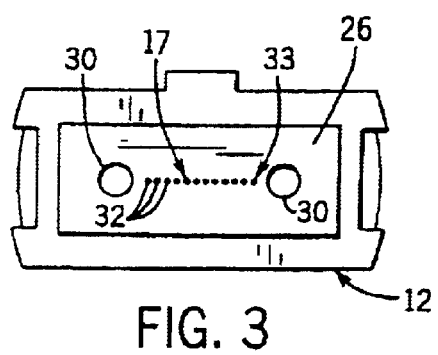
FIG. 3 is a front end view of the ferrule shown in FIGS. 1–2, showing, among other things, the optical fiber element ends and alignment holes.

Referring now to FIG. 3, the proximal end 26 of the ferrule 12 is shown which includes a pair of alignment holes 30 and a set of twelve optical communications fibers 17 having polished fiber ends 32. The fibers 17 and their polished ends 32 are rigidly supported within the ferrule 12. The fiber ends 32 are disposed in a linear array 33 at regular 250 micron intervals along a line extending between the alignment holes 30. The fiber ends 32 are precisely aligned with the holes 30.

Figure 4:
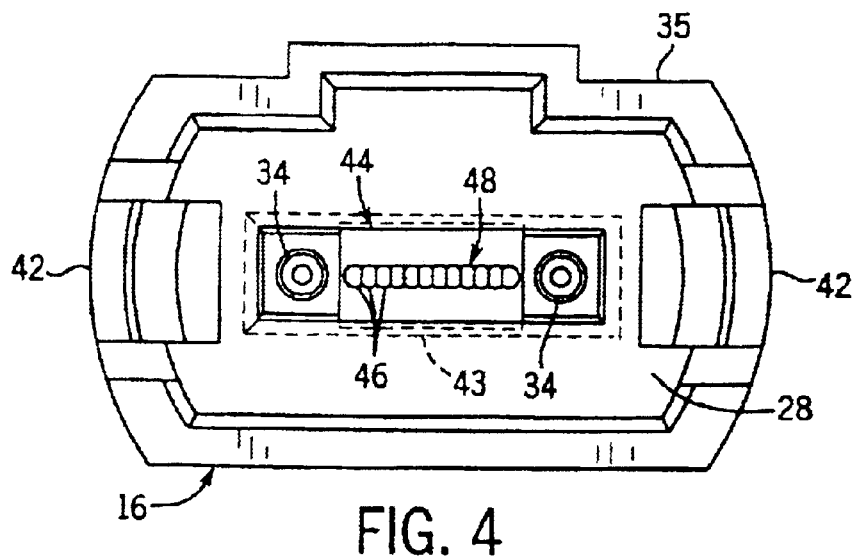
FIG. 4 is a front end view of the optoelectronic subassembly shown in FIGS. 1–2 showing, among other things, the lens and alignment frame including the lens array and the guide pins.

Referring now to FIG. 4, the cavity 28 is defined by a receptacle 35 having jaws 42 for latching onto the ferrule 12. A pair of alignment or guide pins 34 and a set of twelve lenses 46 are disposed in a linear array 48 at regular 250 micron intervals along a line extending between the guide pins 34. The lenses 46 and guide pins 34 are part of a lens and alignment frame 44 which is deployed at the inner end of the cavity 28. As will be later described a set of twelve photoactive components 36 (not shown) are disposed behind the lenses 46 as part of an integrated circuit (IC) chip that comprises an optoelectronic device 40 (not shown in FIG. 4). When the proximal end 26 of the ferrule 12 is latched into the cavity 28 by the jaws 42 the guide pins 34 in the subassembly 16 are engaged with the alignment holes 30 in the ferrule 12 which in turn precisely aligns the lenses 46 in the array 48 (and photoactive components 36 behind the lenses) with the fiber ends 32 in the array 33 so that photonic signals can pass between them.

Figure 5:
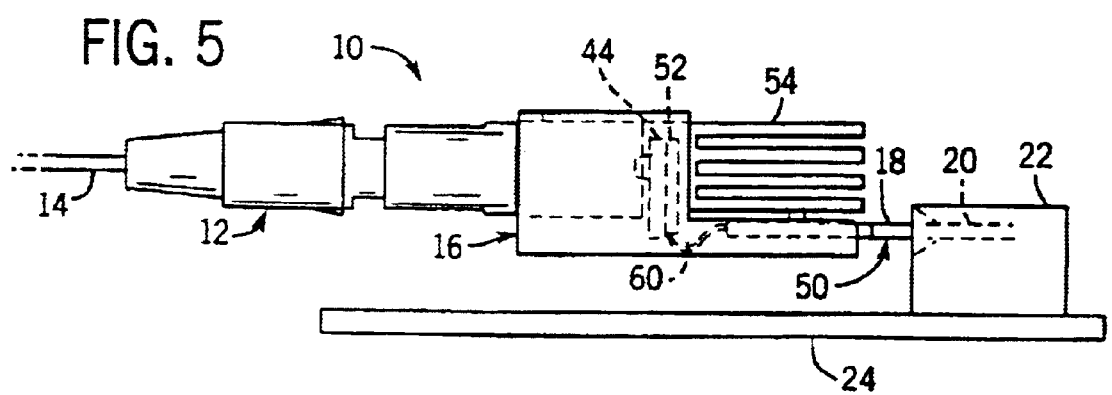

Referring now to FIG. 5, the parallel optics assembly 10 is shown with the ferrule 12 latched into the subassembly 16 and with the edge connector 20 (in phantom) plugged into the jack 22 so that the pads 25 are in electrical contact with the elements of a connector lead frame (not shown) within the jack 22. The jack 22 is surface mounted on the circuit board 24 and thereby electrically interconnected with the circuitry on the board 24 and the computer or communication system of which the board is a part. The edge connector 20 and jack 22 enable the subassembly 16 to be removably connected to the board 24. The subassembly 16 includes a carrier assembly 50 (mostly in phantom) which has a planar carrier frame section 52 at one end which is sandwiched in between the ferrule 12 and a heat sink 54 along with the lens and alignment frame 44. The lens and alignment frame 44 is positioned between the carrier frame section 52 and the ferrule 12 and acts as an interface between them and the components supported in or mounted on them. The carrier assembly 50 also includes a flex circuit 60 (in phantom) which is bendable and which also serves as an integral part of both the frame section 52 and the circuit board 18. The flex circuit 60 extends under the heat sink 54 from the carrier frame section 52 at its one end to the circuit board 18 at its opposite end.

Figure 6:
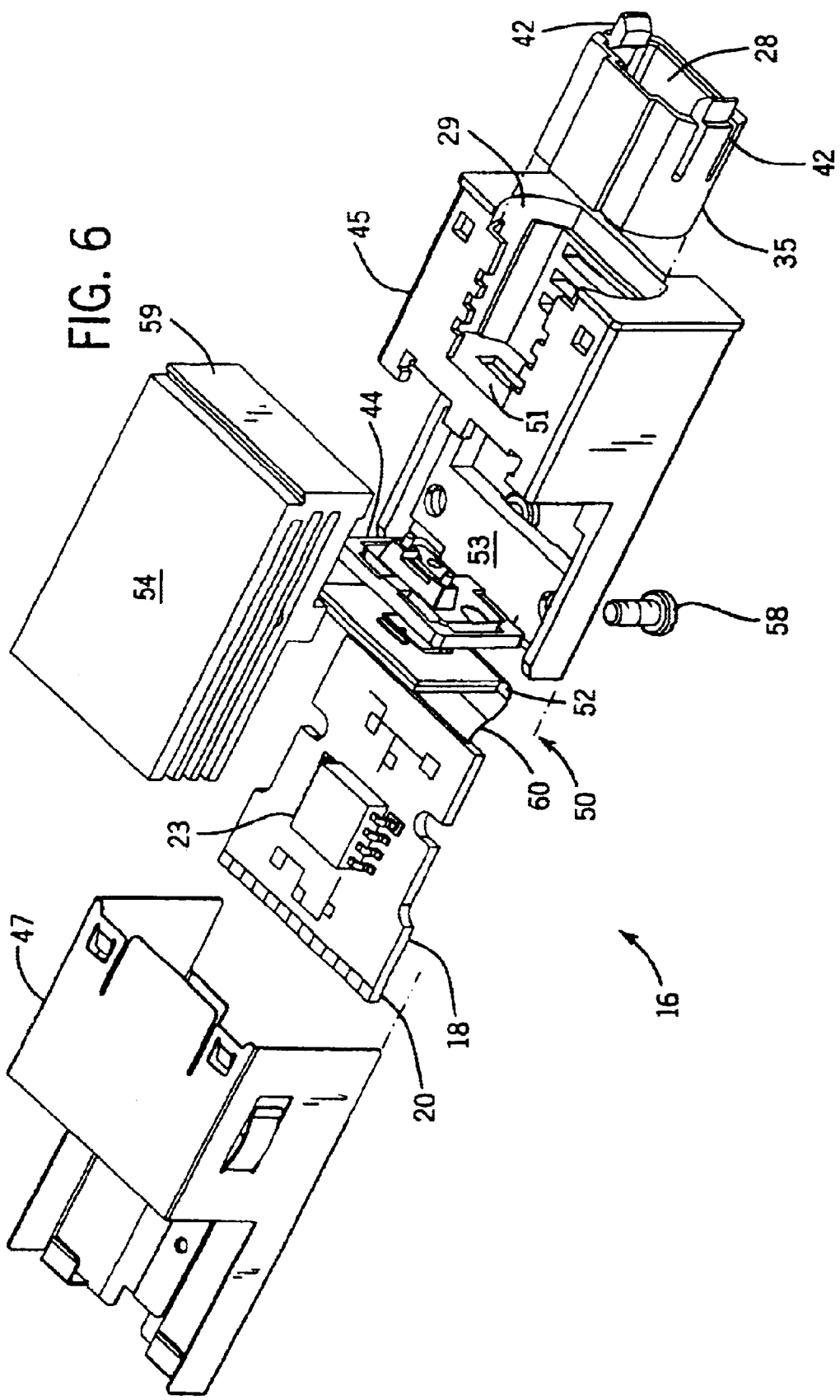
FIG. 6 is an exploded, overhead perspective view of the subassembly of the present invention showing, among other things, how the casing structure, receptacle, lens and alignment frame, carrier frame section, circuit board, edge connector and the other components of the optoelectronic subassembly relate to one another.
Figure 7:
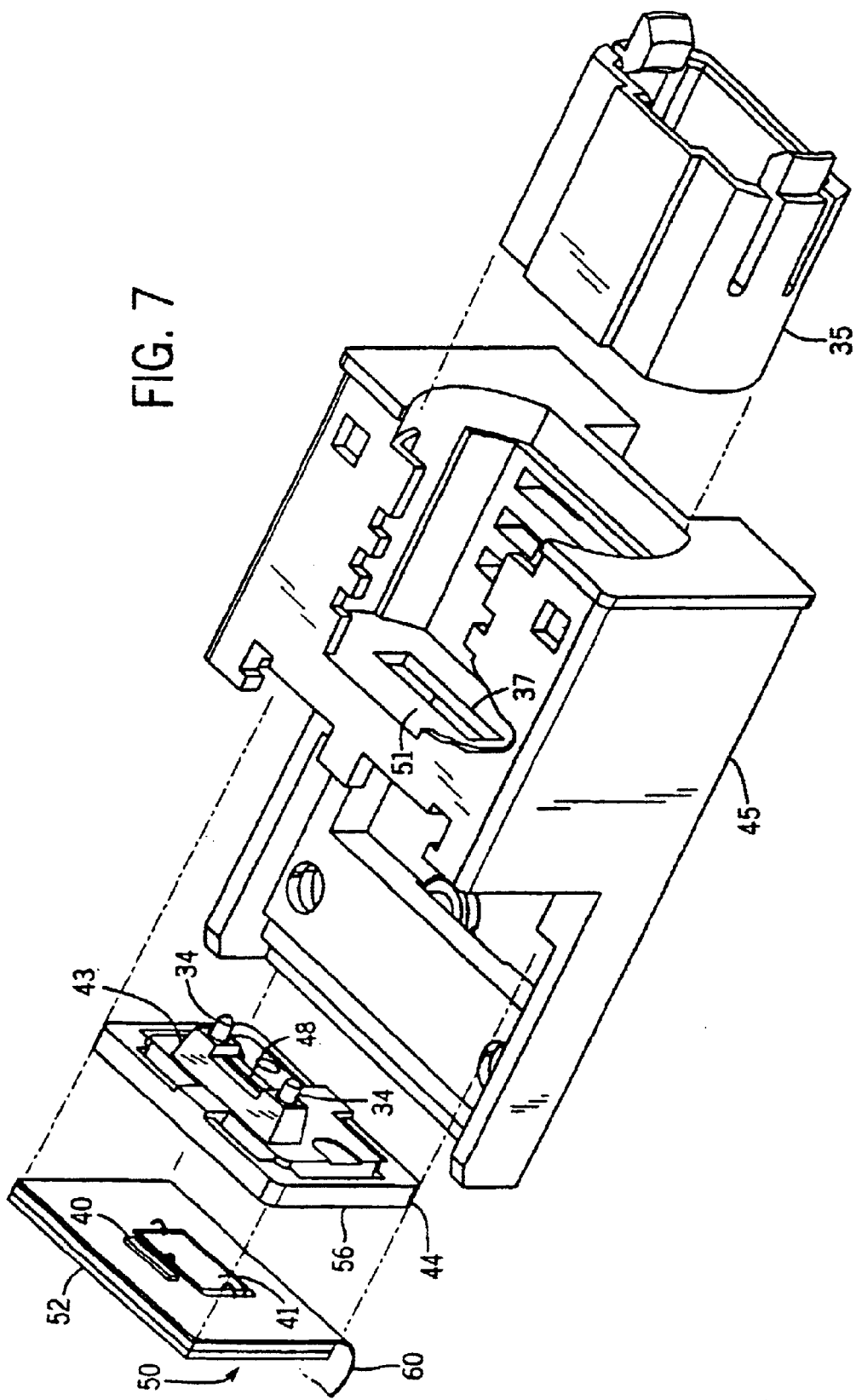
FIG. 7 is an enlarged exploded, overhead perspective view of the front portion of the subassembly of the present invention showing, among other things, how the casing structure, receptacle, lens and alignment frame, and carrier frame section relate to one another.

Referring now to FIGS. 6 and 7, the subassembly 10 includes the receptacle 35, metal casing structure 45, lens and alignment frame 44, carrier assembly 50, heat sink 54 and casing structure 47. As previously explained the receptacle 35 is adapted for receiving the ferrule 12 in the cavity 28. The receptacle is mounted in the recess 29 in the casing structure 45 so that it abuts the back wall 51 of the recess 29. The carrier assembly 50 includes the printed circuit board 18, the flex circuit 60 and the carrier frame section 52. The lens and alignment frame 44 is mounted in between the frame section 52 of the carrier assembly 50 an the back wall 51 of the casing structure 45 so that it is immediately adjacent to the fiber ends 32 on the proximal end 26 of the ferrule 12 when the ferrule is latched into the subassembly 16. The flex circuit 60 connects the frame section 52 to the circuit board 18 serving as a medium for providing a large number of connection lines between components on the carrier frame section 52 and the circuit board 18 including the microcontroller chip 23 and the edge connector 20. The circuit board 18 fits along the back shelf 53 of the casing structure 45 underneath the heat sink 54. The front end 59 of the heat sink 54 abuts the backside of the carrier frame section 52 for dissipating heat generated during operation by the electrical components mounted onto the frame section 52. Except for the heat sinks the metal cover 47 first around the subassembly 16 providing a covering and protection for the receptacle 35, casing structure 45 and the components of the carrier assembly 50 including the circuit board 18 extending along the back shelf 53 of the easing structure 45. The bolts 58 help retain the heat sink 54 and circuit board 18 in position.

A shown more clearly in FIG. 7, the casing structure 45 includes a window 37 in its back wall 51. The lens and alignment frame 44 includes a mostly planar base 56 and a rectangular tower structure 43 projecting forward of the base 56 on which the guide pins 34 and the lens array 48 are mounted. The tower 43 of the lens and alignment frame 44 fits through the window 37 of the casing structure 45 in the assembled device. The lens and alignment frame 44 is a one-piece precision plastic injection-molded part including the tower 43, guide pins 34 and lens array 48. The frame section 52 of the carrier assembly 50 preferably includes one or more layers of printed circuit board material including a layer of flex circuit material 61 which is an extended part of the flex circuit 60. The optoelectronic device 40 is precisely mounted on the frame section 52 and includes the photoactive semiconductor components 36 which are deployed on and as part of an integrated circuit (IC) chip that comprises an optoelectronic device 40. The photoactive components 36 may be either semiconductor transmitter elements or semiconductor receiver elements and are disposed in a linear array 38 at regular 250 micron intervals corresponding to the linear array 48 of the lenses and the linear array 33 of the fibers. When the lens and alignment frame 44 is mounted on the frame section 52 the optoelectronic device 40 and photoactive components 36 are precisely aligned with the lens array 48 and the guide pins 34. If the photoactive elements 36 are intended to be transmitter elements (a transmitter subassembly) they may, for example, be light emitting diodes (LEDs) or laser diodes. They are preferably vertical cavity surface-emitting lasers (VCSELs). If the photoactive elements 36 are intended to be receivers elements (a receiver subassembly) they may, for example, be PIN photodiodes or avalanche photodiodes (APDs) although they are preferably PIN photodiodes. One or more signal processing chips 41 may be mounted on the frame section 52 for communicating with the optoelectronic device 40 and more particularly providing drive signals to transmitter elements or providing signal amplification and conditioning in the case of receiver elements.

Figure 8:
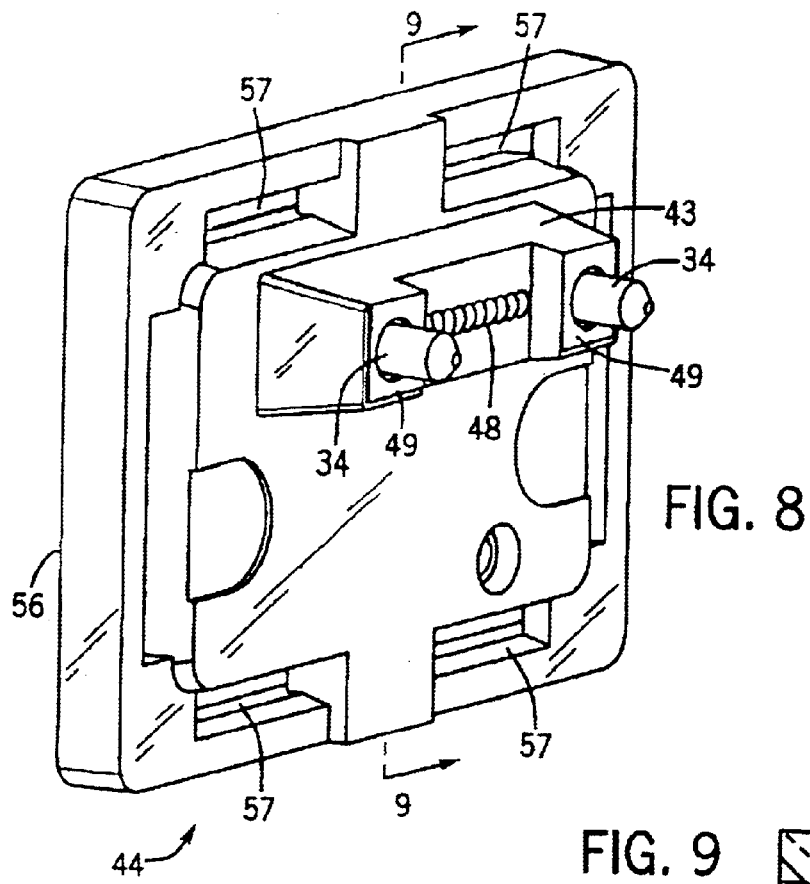
FIG. 8 is a perspective view of the one-piece lens and alignment frame component of the present invention showing, among other things, the tower structure and the lens array and guide pins which are built into the tower structure.
Figure 9:
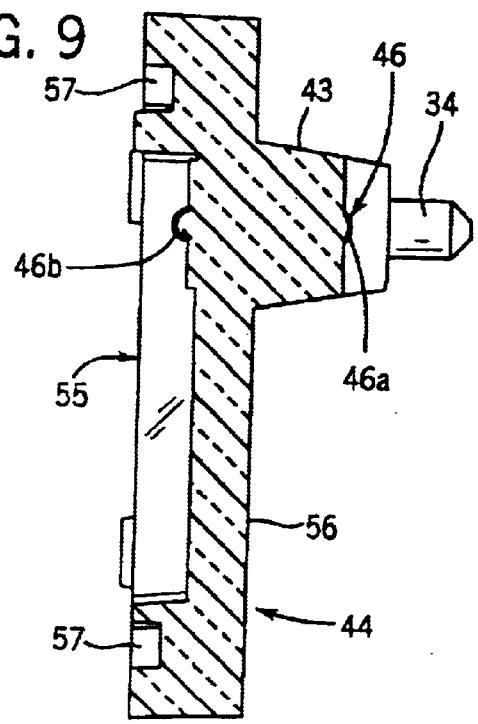
FIG. 9 is a vertical cross sectional view of the lens and alignment frame of the present invention taken along section line 9—9 of FIG. 8 showing again, among other things, the arrangement of the tower structure, lens array and guide pins.

Referring now to FIGS. 8 and 9, the lens and alignment frame 44 includes a main body or base 56 and a tower 43. The base 56 is mostly planar and includes cavities 57 into which adhesive materials can flow during mounting and a large but shallow recess 55 for accommodating components and wiring on the front side of the carrier frame section 52 on which the lens and alignment frame 44 is mounted. The tower 43 resides on the front side of the frame section 52 and projects well forward of the base 56. The tower 43 includes a pair of turret-like elevated end sections 49 on top of which the guide pins 34 are mounted so as to project outward and forward from the base 56 and lens array 48. The lenses 46 in the array 48 are deployed at regular 250 micron intervals along a line extending between the elevated end sections 49 and guide pins 34 in a manner corresponding to the arrangement of the photoactive components 36 of the optoelectronic device 40 and fibers 17 of the ferrule 12. The lenses 46 are precisely aligned with the guide pins 34. Each lens 46 in the array 48 includes a front lens element 46a and a rear lens element 46b for directing light to and from the fiber ends 32 and photoactive components 36, respectively.

Figure 10:
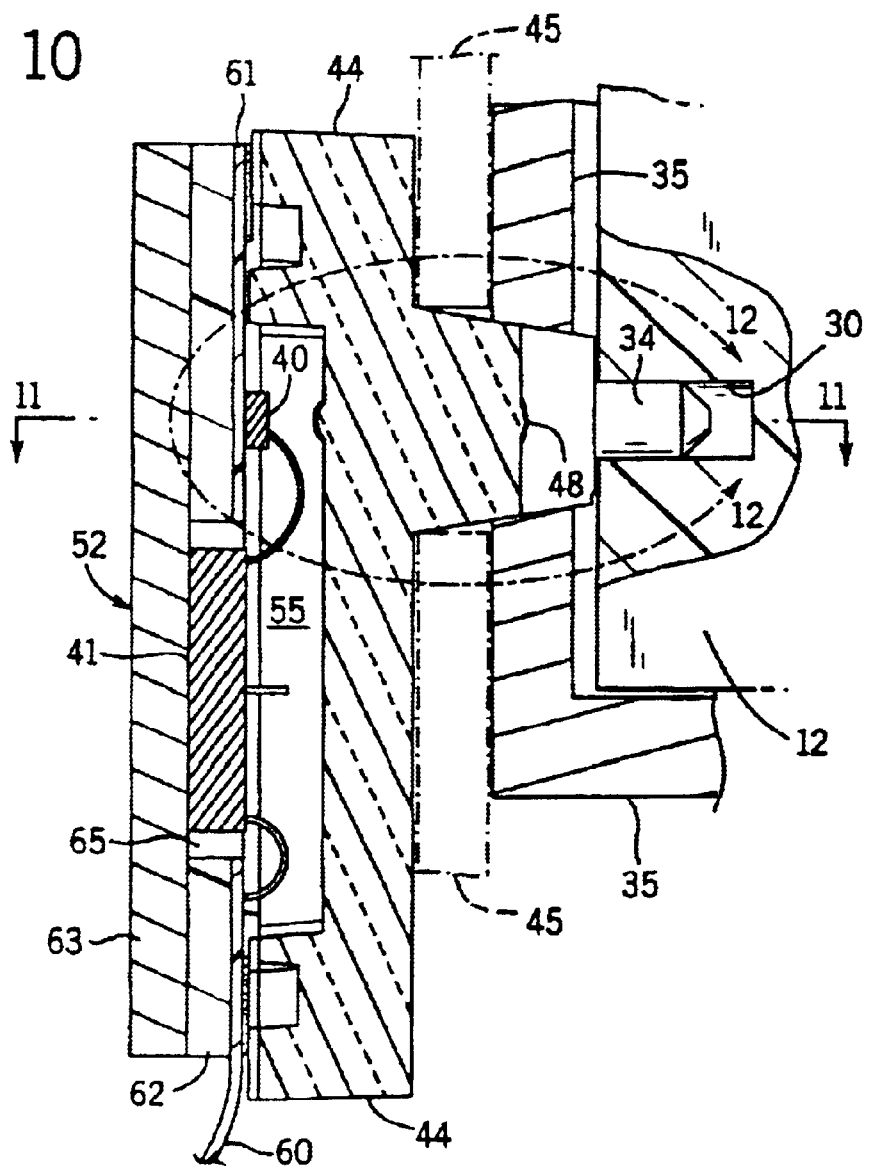
FIG. 10 is a vertical sectional view of the carrier frame section, lens and alignment frame, receptacle (inner end) and ferrule (proximal end) in assembled form showing, among other things, the vertical alignment of the ferrule with the lens and alignment frame and the carrier frame section and the alignment of the lens array with the optoelectronic device.

Referring now to FIGS. 10 and 14, the lens and alignment frame 44 is precisely mounted on the carrier frame section 52 and cooperates with the receptacle 35 in achieving alignment with the ferrule 12. The frame section 44 is mounted flush on the front side of the frame section 52 using epoxy adhesive so as to carefully center the lens array 48 over the optoelectronic device 40 and more particularly the array 38 of photoactive components 36 which comprises the optoelectronic device 40. The recess 55 in the frame 44 provides space to accommodate the chips 40 and 41 and to accommodate the wire bonds whereby the chips 40 and 41 are interconnected and connected to the signal traces on the flex circuit 60 part of the carrier assembly 50. The frame section 52 preferably includes a flex circuit layer 61, a layer of FR-4 printed circuit board material and a thin layer 63 of copper plate. The signal processing chip 41 may then be mounted in a small well 65 in the flex circuit layer 61 and circuit board layer 62 of the frame section 52 so that it is in direct contact with the copper layer 63 to improve heat dissipation in connection with the operation of the heat sink 54 which is attached to the layer 63 on the backside of the frame section 52. The tower 43 passes through the window 37 in the casing structure 47 and fits into a second window 31 in the back wall at the inner end of the receptacle 35 which assists in making sure that the receptacle is aligned with the frame 44 and the frame section 52 and ferrule 12 are then aligned as the ferrule 12 is latched into the receptacle 35. The guide pin 34 of the lens and alignment frame 44 fits into the alignment hole 30 in the ferule 12 for precisely aligning the array 33 of optical fibers 17 (not shown in FIG. 10) with the lens array 48.

Figure 11:
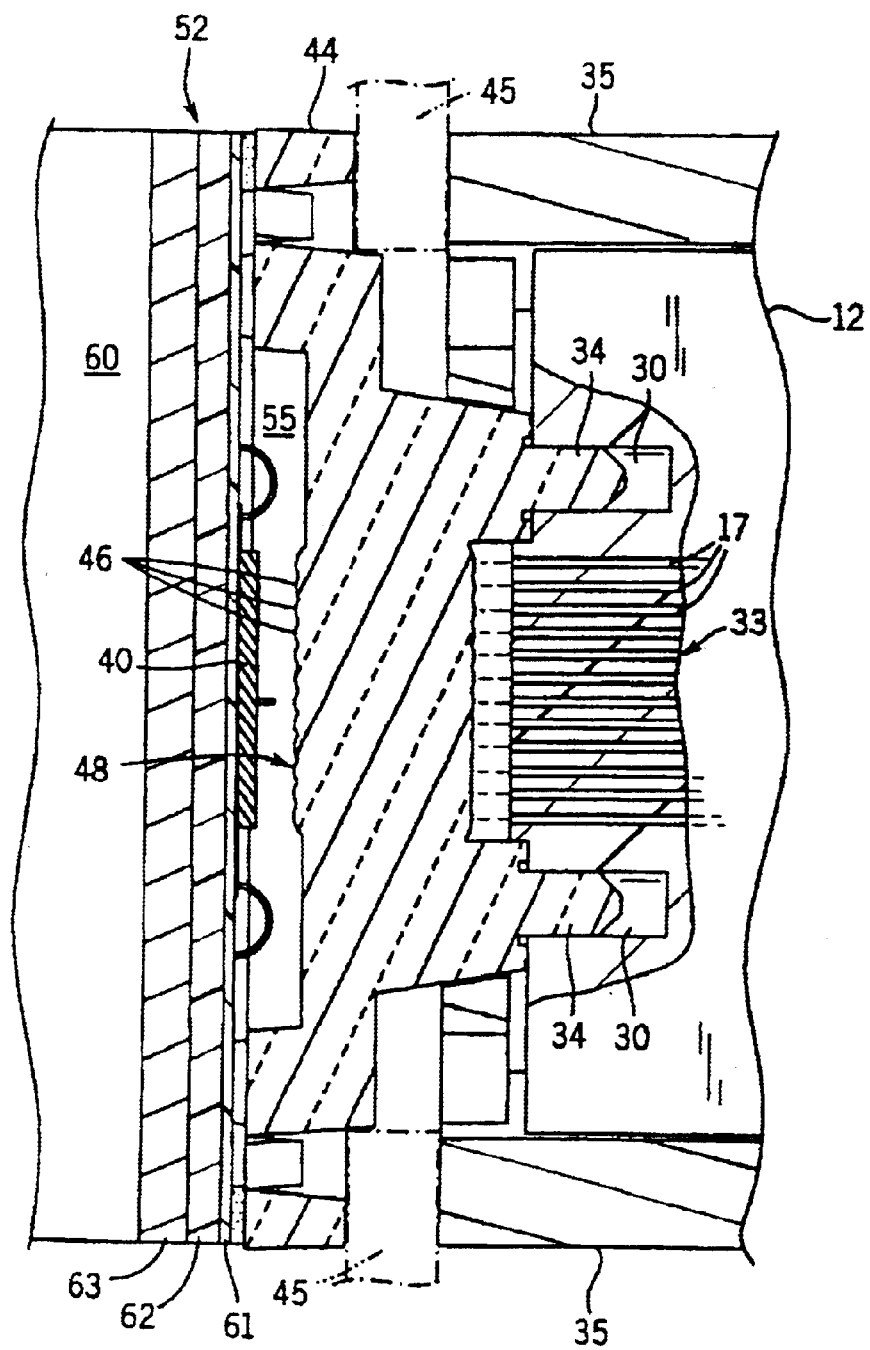
FIG. 11 is a lateral view of the carrier frame section, lens and alignment frame, receptacle (inner end) and ferrule (proximal end) in assembled form showing, among other things, the lateral alignment of the ferrule with the lens and alignment frame and the carrier frame section and the alignment of the optical fibers with the lens array and the optoelectronic device.

Referring now to FIG. 11, it can seen again that the lens and alignment frame 44 is mounted on carrier frame section 52 so that the array 48 of lenses 46 is aligned with the optoelectronic device 40 and accordingly with the linear array 38 of photoactive components 36 which comprise the optoelectronic device 40. The ferrule 12 is in turn coupled to the lens and alignment frame 52 by the action of the guide pins 34 which closely fit into the alignment holes 30 when the ferrule is inserted and latched into the receptacle 35 of the subassembly 16. Since the lens array 48 and fiber array 33 are accurately positioned with respect to the guide pins 34 and alignment holes 30, the guide pins and alignment holes 30 are operative for aligning the array 33 of optical fibers 17 with the array 48 of lenses 46. The lens and interface frame 44 thereby provides for the alignment of the array 33 of fibers 17 with the array 48 of lenses 46 and with the optoelectronic device 40 and more particularly with the array 38 (not shown) of photoactive components 36 (not shown) in the optoelectronic device 40. The alignment of the fibers 17 with the lenses 46 and the photoactive components of the optoelectronic device 40 (semiconductor chip) enables the transmission of photonic (light) signals from the optoelectronic device 40 to the fibers 17 in a transmitter subassembly 16 or from the fibers 17 to the optoelectronic device 40 in a receiver subassembly 16. The lens and alignment platform 44 also serves to fix the distances over which light is focused by the lenses 46. These distances are established by the offsets from the lenses 46 in the frame 44 to the frame section 52 and optoelectronic device 40 one side (across the recess 55) and to the ferrule 12 and fibers 17 on the other side.

Figure 12:
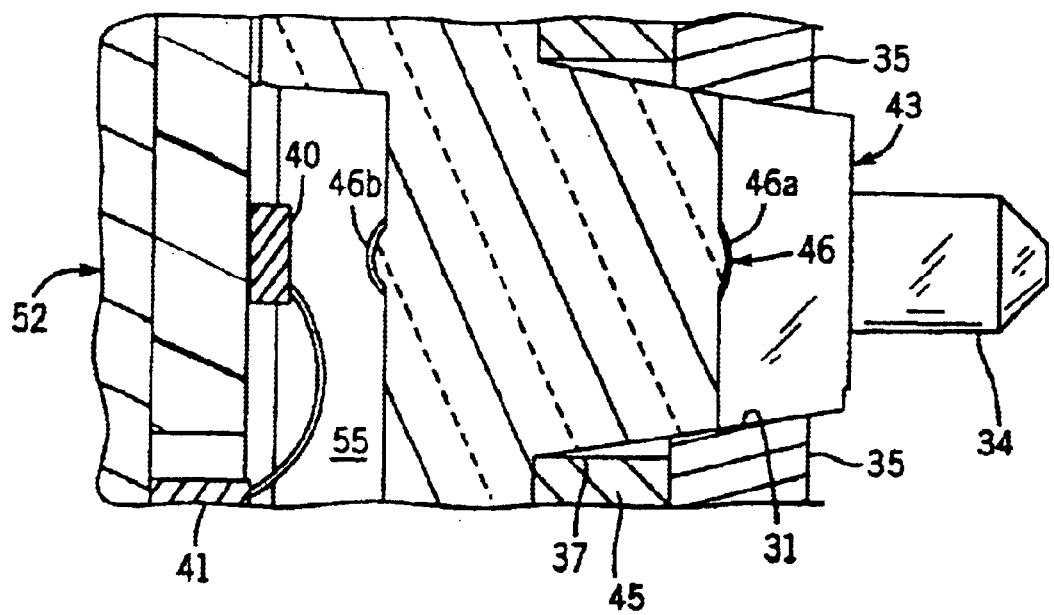
FIG. 12 is an enlarged vertical sectional view around section line 12—12 of FIG. 10 illustrating the upper portions of the carrier frame section and lens and alignment frame in assembled form showing, among other things, the lens elements making up the lenses in the lens array and the alignment of the tower of the lens and alignment frame with the window in the back wall of the receptacle and the alignment of the lens elements with the optoelectronic device.

Referring now to FIG. 12, the lenses 46 are biconvex in shape and are each comprised of two planoconvex lens elements 46a and 46b on the front and back sides of the central section of the tower 43 of the lens and alignment frame 44 between the elevated end sections 49. Also, referring again to FIG. 11, the individual lenses 46 are operative for directing light to and from the individual fibers 17, through the lens and alignment frame 44 and to and from the individual photoactive components in the optoelectronic device 40. The lens elements 46a are adapted for focusing light to and from the fibers 17 while the lenses elements 46b are adapted for focusing light to and from the optoelectronic device 40. In the preferred embodiment the lens elements 46a and 46b making up the lenses 46 may, by way of example, be characterized by the values shown in TABLE I.

TABLE I

Lens Element Key Parameter Values

|  | LENS 1 (46b) | LENS 2 (46a) |
|---|---|---|
| N (index) (um) | 1.632 | 1.632 |
| D (focus) (um) | 300 | 450 |
| k | −2.663424 | −2.663424 |
| R (radius at apex) | 189.6 | 284.4 |
| half aperture (um) | 200 | 200 |
| z (sag) (um) | 78.47245944 | 59.84856468 |
| LENS 1 | element 46b | Device side |
| LENS 2 | element 46a | Fiber side |

Lens Element Sag Values

| r (um) | LENS 1 z (um) | LENS 2 z (um) |
|---|---|---|
| 50 | 6.412449 | 4.340131 |
| 100 | 23.87155 | 16.75945 |
| 150 | 48.86220 | 35.80733 |
| 200 | 78.47245 | 59.84856 |

The lens elements 46a (fiber side) have a focal length D of about 450 microns and the lens elements 46b (device side) have a focal length D of about 300 microns with the fibers 17 and optoelectronic device 40 then being positioned at or near the focal points of these lens elements. However, the fibers 17 may be preferably positioned away from the focal points by about 100–200 microns toward the lens element 46a. This may allow the for some of the light emitted in transmitter subassemblies at higher off-axis angles by transmitter components 36 such as VCSELs which is subject to slower modulation patterns to be focused (or rather defocused) away from the fiber ends 32 of the fibers 17. The optimal amount of defocusing depends on the numerical aperture values of the VCSELs and the fibers.

Figure 13:
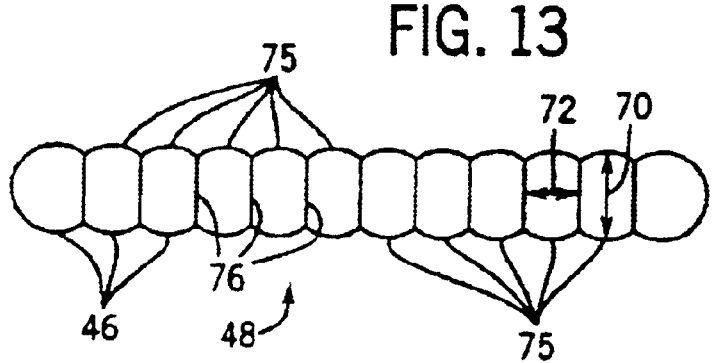
FIG. 13 is a plan view of the lens array and lens elements comprising the lenses of the lens array which is part of the lens and alignment frame showing the vertically elongated shaping of these lens elements and their deployment with respect to each other.

Referring now to FIG. 13, the lenses 46 are collinearly and contiguously positioned in the lateral direction from end to end across the array 48. The lenses 46 are characterized by a vertically elongated shape and have a greater height than width. The lenses 75 on the interior of the array 48 are about 400 microns high in the vertical direction 70 and are about 250 microns wide in the lateral direction 72. The lenses 46 intersect along extended common boundaries 76 extending out from the centerline of the array 48 by about 156 microns with each boundary measuring about 312 microns in total length. The lenses 46 are in effect truncated in the lateral direction at their boundaries 76. In effect the lenses 46 are extended vertically and are larger than the natural 250 micron pitch (center-of-lens to center-of-lens distance) of the array 48. The elongated lenses 46 provide improved light gathering characteristics and improved tolerance to mechanical misalignments affecting optical coupling efficiency as compared to smaller symmetrically shaped lens designed to intersect at a point along the centerline of the array 48.

Although only a few embodiments of the present invention have been described in detail, it should be understood that the invention may be embodied in other forms without departing from its overall spirit or scope.

I claim:

1. A lens array for use in focusing light between a set of photoactive components and a set of optical fibers, comprising:
   a plurality of asymmetric biconvex lenses formed as a part of a common platform, wherein each lens of the plurality of asymmetric biconvex lenses are:
   a) collinearly and contiguously positioned in a lateral direction, and
   b) truncated in said lateral direction so that the each lens of the plurality of asymmetric biconvex lenses has an extended boundary between adjacent lenses of the plurality of asymmetric biconvex lenses, and each lens of the plurality of asymmetric biconvex lenses having a width and a height, and wherein the height is approximately 1.5 times greater than the width, and wherein
   said common platform includes a set of alignment pins precisely aligned with said plurality of asymemetric biconvex lenses for mating with alignment holes in a ferrule supporting said set of optical fibers, and wherein
   said platform and said plurality of asymmetric biconvex lenses comprise molded plastic.

2. An assembly for use in optical communications, comprising:
   a) an optical ferrule for supporting a set of optical fibers disposed in a linear array;
   b) an optical transmitter subassembly for transmitting photonic signals to said set of optical fibers including a set of semiconductor lasers disposed in a linear array; and
   c) a lens platform including a set of optical lenses, and wherein each lens of the set of optical lenses has a height and a width, and wherein the height is approximately 1.5 times the width, and wherein and each lens of the set of optical lenses having extended common boundaries which are contiguously positioned in a linear array corresponding to said set of optical fibers and said set of semiconductor lasers, and wherein
   said lens platform includes a set of alignment pins precisely aligned with said set of optical lenses for mating with alignment holes in said optical ferrule, and wherein said lens platform and said set of optical lenses comprise molded plastic.

3. An assembly for use in optical communications, comprising:
   a) an optical ferrule for supporting a set of optical fibers disposed in a linear array;
   b) an optical receiver subassembly for receiving photonic signals from said set of optical fibers including a set of semiconductor PIN diodes disposed in a linear array; and
   c) a lens platform including a set of optical lenses, and wherein each lens of the set of optical lenses has a height and a width, and wherein the height is approximately 1.5 times the width, and wherein and each lens of the set of optical lenses having extended common boundaries which are contiguously positioned in a linear array corresponding to said set of optical fibers and said set of semiconductor PIN diodes, and wherein
   said lens platform includes a set of alignment pins precisely aligned with said set of optical lenses for mating with alignment holes in said optical ferrule, and wherein
   said lens platform and said set of optical lenses comprise molded plastic.

4. A lens and alignment frame for use in optically and mechanically interfacing and integrated circuit chip having a set of photoactive components which is attached to a carrier assembly with a set of optical fibers supported in a ferrule having a set of alignment holes precisely positioned with respect to said set of optical fibers, said lens and alignment frame including:
   a planar base adapted for being mounted on said carrier assembly;
   an array of collinear lenses each of which have greater height than lateral width mounted for focusing light between said set of optical fibers and said set of photoactive components;
   a set of guide pins projecting forward of said planar base for mating with said alignment holes in said ferrule in order to position said ferrule and said set of optical fibers with respect to said lens and alignment frame, said carrier assembly and said integrated circuit chip; and
   a tower structure on which said set of optical lenses and said set of guide pins are mounted, and wherein said tower structure includes a pair of elevated end sections on which said set of guide pins are mounted, and wherein
   the height of each lens of the array of collinear lenses is approximately 1.5 times the width of each lens of the array of collinear lenses.

5. An assembly for use in optical communications, the assembly comprising:
   an optical ferrule having a plurality of optical fibers, a first alignment hole, and a second alignment hole, and wherein each optical fiber of the plurality of optical fibers has a polished end, each polished end of the plurality of optical fibers being aligned in a first linear array, the first alignment hole and the second alignment hole being collinear with each polished end of the plurality of optical fibers, the polished end of a first optical fiber of the plurality of optical fibers being separated from the polished end of a second optical fiber of the plurality of optical fibers by a first interval, and each polished end of the plurality of optical fibers being aligned relative to the first alignment hole and the second alignment hole, and wherein the first interval is approximately equal to 250 microns, and wherein the plurality of optical fibers includes twelve optical fibers;
   a plurality of photoactive components, each photoactive component of the plurality of photoactive components being aligned in a second linear array, a first photoactive component of the plurality of photoactive components being separated from a second photoactive component of the plurality of photoactive components by a second interval, and wherein the second interval is substantially equal to the first interval;
   a lens and alignment frame having a base, a tower, a first alignment pin, a second alignment pin, and a plurality of lenses, and wherein the tower projects away from the base, and wherein the first alignment pin projects away from the tower, and the second alignment pin projects away from the tower, and each lens of the plurality of lenses being aligned in a third linear array, each lens of the plurality of lenses has a respective front lens element and a respective rear lens element, a first lens of the plurality of lenses being separated from a second lens of the plurality of lenses by a third interval, and wherein the third interval is substantially equal to the first interval, and each lens of the plurality of lenses being a respective asymmetric biconvex lens, each lens of the plurality of lenses being truncated in a lateral direction so as to have a height dimension and a width dimension, and wherein the height dimension is approximately 1.5 times the width dimension, and a boundary between the first lens and the second lens being contiguous, and wherein the lens and alignment frame is made of a plastic material, and wherein
   the plurality of photoactive components is mounted on the lens and alignment frame so that each photoactive component is aligned with the first alignment pin and the second alignment pin, and the respective rear lens element of each lens of the plurality of lenses faces the plurality of photoactive components, and wherein
   when the optical ferrule is mated with the lens and alignment frame, the first alignment pin of the lens and alignment frame is introduced into the first alignment hole of the optical ferrule, and the second alignment pin of the lens and alignment frame is introduced into the second alignment hole of the optical ferrule, and the plurality of lenses is positioned between the plurality of photoactive components and the plurality of optical fibers so that the respective front lens element of each lens of the plurality of lenses faces the plurality of optical fibers and so that the plurality of photoactive components are in optical communication with the plurality of optical fibers via the plurality of lenses.

* * * * *